US010802979B2

(12) United States Patent
Xu et al.

(10) Patent No.: US 10,802,979 B2
(45) Date of Patent: Oct. 13, 2020

(54) DYNAMIC CODE EXECUTION LOCATION IN HETEROGENEOUS MEMORY

(71) Applicant: Intel Corporation, Santa Clara, CA (US)

(72) Inventors: Shu Xu, Shanghai (CN); Tianyou Li, Shanghai (CN); Zidong Jiang, Shanghai (CN); Weiliang Lion Lin, Shanghai (CN); Jinkui Ren, Shanghai (CN); Chaobo Zhu, Shanghai (CN); Xiaokang Qin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,588

(22) PCT Filed: Jan. 27, 2017

(86) PCT No.: PCT/CN2017/072787
§ 371 (c)(1),
(2) Date: Jun. 25, 2019

(87) PCT Pub. No.: WO2018/137257
PCT Pub. Date: Aug. 2, 2018

(65) Prior Publication Data
US 2019/0332545 A1 Oct. 31, 2019

(51) Int. Cl.
*G06F 12/10* (2016.01)
*G06F 12/0891* (2016.01)
(Continued)

(52) U.S. Cl.
CPC ...... *G06F 12/0891* (2013.01); *G06F 12/0638* (2013.01); *G06F 12/0804* (2013.01); *G06F 17/11* (2013.01)

(58) Field of Classification Search
CPC .................................................. G06F 12/0891
(Continued)

(56) References Cited

U.S. PATENT DOCUMENTS 9,262,325 B1   2/2016 Sundararajan et al.
10,419,170 B2 *  9/2019 Meylan ................ H04L 1/1838
(Continued)

FOREIGN PATENT DOCUMENTS

CN      1480850 A       3/2004
WO   WO-2018137257 A1   8/2018

OTHER PUBLICATIONS

"ADSP-CM40x Serial Flash Execute-in-Place Technology", Analog Devices—Rev. 2.0 (EE-363, (Dec. 7, 2015), 24 pgs.
(Continued)

*Primary Examiner* — Jae U Yu
(74) *Attorney, Agent, or Firm* — Schwegman Lundberg & Woessner, P.A.

(57) ABSTRACT

Systems and techniques for dynamic code execution location in heterogeneous memory are described herein. In an system having a first class of memory and second class of memory that are both byte-addressable, an interpreter may be initialized to execute a program from the first class of memory. The initialization may include locating an Interpreter Routine Address Table (IRIT) in the second class of memory and creating counters for routines in the IRIT. A counter for a routine may be modified as it is referenced from the IRIT during execution. The routine may be moved from the first class of memory to the second class of memory in response to the counter passing a threshold. An entry in the IRIT for the routine may be updated with an address in the second class of memory corresponding to the routine.

24 Claims, 4 Drawing Sheets

(51) Int. Cl.
*G06F 12/06* (2006.01)
*G06F 12/0804* (2016.01)
*G06F 17/11* (2006.01)

(58) Field of Classification Search
USPC .......................................................... 711/135
See application file for complete search history.

(56) References Cited

U.S. PATENT DOCUMENTS

| | | | |
|---|---|---|---|
| 2012/0017039 A1* | 1/2012 | Margetts | G06F 12/1009 711/105 |
| 2014/0208019 A1 | 7/2014 | Wu et al. | |
| 2014/0223098 A1 | 8/2014 | Lee et al. | |
| 2016/0378655 A1 | 12/2016 | Blagodurov et al. | |

OTHER PUBLICATIONS

"C-Start and device initialization (XMC1000)", Infineon Technologies, Rev. 1.0, (Feb. 22, 2016), 29 pgs.
"Improving Execution Performance on SPI Flash of NUC505", Nuvoton Technology Corporation, Rev. 1.00, (Oct. 12, 2015), 24 pgs.
"International Application Serial No. PCT/CN2017/072787, International Search Report dated Nov. 8, 2017", 4 pgs.
"International Application Serial No. PCT/CN2017/072787, Written Opinion dated Nov. 8, 2017", 4 pgs.
Alter, David M, "Running an Application from Internal Flash Memory on theTMS320F28xxx DSP", Texas Instruments—Application Report SPRA958L, (Jan. 2013), 45 pgs.

* cited by examiner

DYNAMIC CODE EXECUTION LOCATION IN HETEROGENEOUS MEMORY

CLAIM OF PRIORITY

This application is a U.S. National Stage Application under 35 U.S.C. 371 from International Application No. PCT/CN2017/072787, filed Jan. 27, 2042, published as WO 2018/137257, which is incorporated herein by reference in its entirety.

TECHNICAL FIELD

Embodiments described herein generally relate to memory management and more specifically to dynamic code execution location in heterogeneous memory.

BACKGROUND

Computer memories come in a variety of designs exhibiting a variety of capabilities. These memories—in contrast to other computer storage devices such as hard disk drives, floppy disk drives, compact discs, etc.—operate by reading and writing bytes (e.g., 8 bit, 32 bit, 64 bit, etc. depending on the word size). Many computer architectures execute programs from byte-addressable memory; something that is generally not possible from other computer storage devices. Heterogeneous memory systems are those in which multiple different types of memory exist within the same system. Examples may include systems with a byte-addressable flash memory as a first type and dynamic random access memory (DRAM) as a second type.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
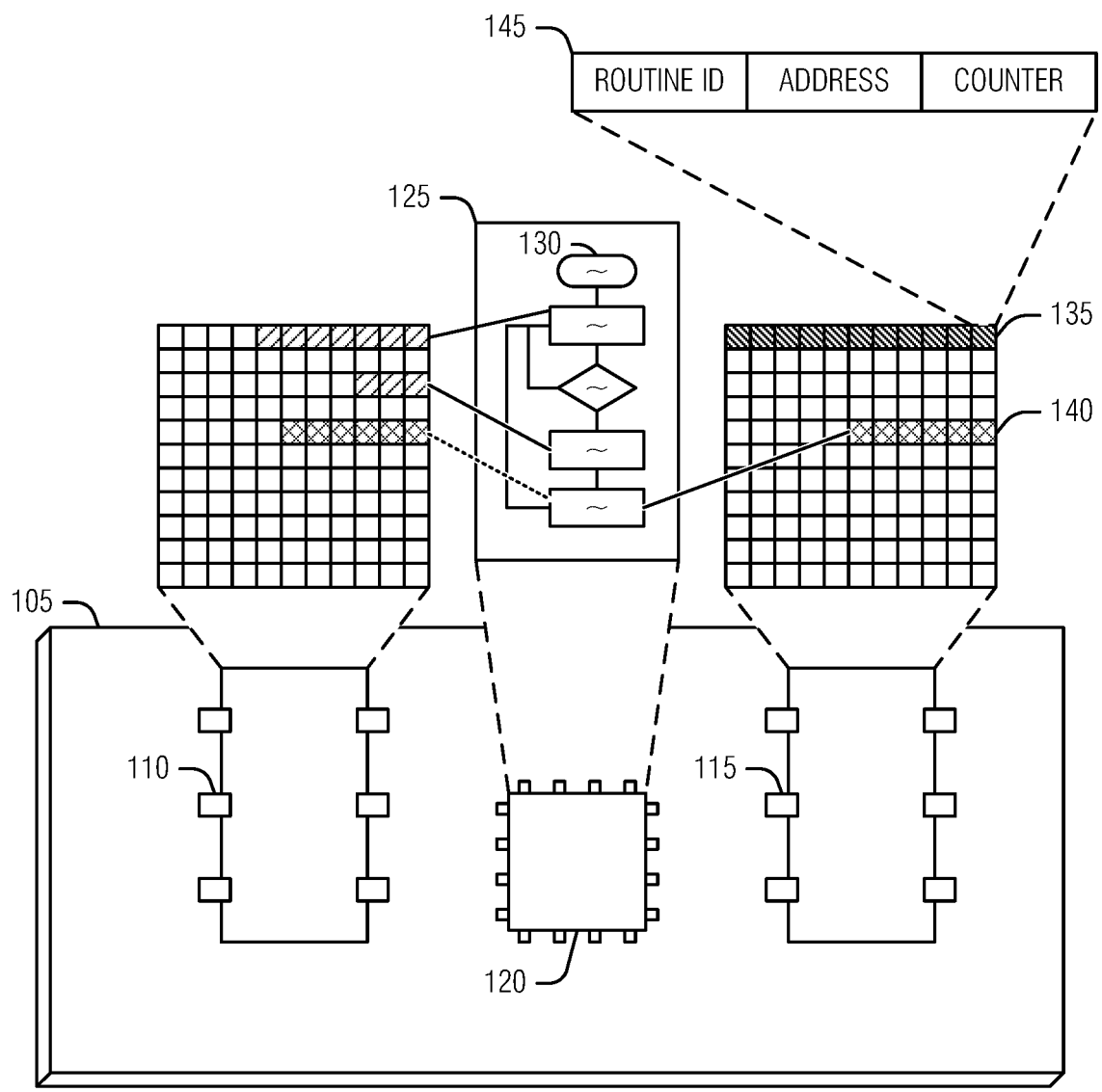
FIG. 1 is a block diagram illustrate an example of a system for dynamic code execution location in heterogeneous memory, according to an embodiment.

Heterogeneous main memory systems are used in a variety of computer systems, from small, low-end embedded systems to large, high-end servers. An issue for such systems is balancing factors of cost, capacity, performance, and power when determining how much of the different types of memory should be including in a system. This issue may be pronounced in cost or power sensitive embedded systems in which the amount of static RAM (SRAM) and NOR flash is limited by design considerations. Example embedded systems where this issue may be large include smart sensors, wearables, robot controllers, or devices in the Internet-of-Things (IoT) domain.

Some existing solutions use execution in place (XIP) to execute code blocks from byte-addressable flash (or other cheaper but slower technologies) to reduce the SRAM or DRAM usage footprint. Thus, XIP allows a program to be executed directly from byte-addressable NOR flash without loading it into SRAM or DRAM. This technique some drawbacks, however. First, all executed code will load from flash to a microcontroller unit register. This process may result in large penalties (e.g., in time) if there is an instruction cache (i-cache) miss that may be more pronounced at program startup. Second, due to the slow (e.g., high latency) retrieval of code blocks from the XIP memory, frequently used portions of the code will multiply the increased latency of instruction fetching that exists between the flash memory and SRAM, for example. As noted above, copy-to-ram (e.g., treating the flash memory in the same manner as one would a block device) or using the SRAM as a cache have also been tried but generally use SRAM inefficiently in terms of the amount of SRAM used or poor cache inclusion and eviction procedures leading to cache misses.

To address the issues noted above, a runtime, such as a virtual machine (VM) runtime, may dynamically schedule and execute code blocks between slow NOR flash and fast SRAM according to how often the code block is used (e.g., a "hotness") and how many SRAM resources will be consumed by the code block (e.g., a "cost"). Experimentally, the techniques described below have resulted in over a 33% performance increase for existing NOR flash and SRAM heterogeneous systems running a JavaScript interpreter. These results also suggest that an equivalent performance level may be maintained in a system while reducing the amount of SRAM in the system; which, in turn reduces the costs (in terms of material and power) of the system.

Dynamic code execution may be implemented by using software profiling counters to identify the most popular routine byte codes located in an XIP flash image; the counters also recording the resource cost of those byte codes. Those byte codes that are popular enough and resource efficient enough may have an equivalent byte code created that is resident in SRAM. The executor of the byte code, such as an interpreter, is modified to execute the byte code out of both flash and SRAM to make use of the equivalent byte code. Thus, for frequently called byte codes, the latency and performance benefit of SRAM, or the like, may be used while the total SRAM usage is reduced because much of the program executes directly from the flash memory, or the like. Additional details and examples are provided below.

FIG. 1 is a block diagram illustrate an example of a system 105 for dynamic code execution location in heterogeneous memory, according to an embodiment. The system 105 includes a first class of memory (e.g., type I memory) 110, a second class of memory (e.g., type II memory) 115, and a controller 120 (e.g., an MCU, processor, circuits, etc.). The first class of memory 110 and the second class of memory 115 are different types of memory, the first class of memory 110 being at least slower than the second class of memory 115 in performing a read operation. However, both the first class of memory 110 and the second class of memory 115 are byte-addressable and allow direct execution of a program 130 by the controller 120.

The controller 120 is arranged to initialize an interpreter 125 to execute the program 130 from the first class of memory 110. Here, the initializing includes locating an Interpreter Routine Address Table (IRIT) 135 in the second class of memory 115 and creating counters for routines in the IRIT 135. Generally, the IRIT 135 specifies addresses for byte code routines (e.g., byte code 140) for the program 130. The IRIT may include an entry 145 for each routine that, in an example, may include the counter along with an identifier (ID) for the routine and an address. Locating the IRIT 135 in the second class of memory 115 allows the IRIT 135 to be changed (e.g., updated) over time whereas, if the first class of memory 110 is not re-writable, would not be possible. Even if the first class of memory 110 is re-writable, locating the IRIT 135 in the second class of memory 115 may provide far faster address lookups and thus reduce program latency. In an example, the first class of memory 110 is an XIP flash device. In an example, the second class of memory 115 is a SRAM device. In an example, the second class of memory 115 is a DRAM device.

In an example, to create the counters, the controller 120 is arranged to create the counter with a default value for the routine. The default value may be zero if the counter counts up. If the counter counts down, the default value may be determined by a number of calls to the routine considered sufficient to make the routine "popular," "hot," or otherwise notable for consideration to be promoted from the first class of memory 110 to the second class of memory 115.

The controller 120 is arranged to modify a counter for a routine as it is referenced from the IRIT 135 during execution of the program 130. In this example, the routine residing in the first class of memory 110. Note that routine 140 is illustrated via cross-hatch shading on bytes in both the first class of memory 110 and the second class of memory 115. At the stage described in this example, the routine 140 has not yet moved to the second class of memory 115.

In an example, to modify the counter for the, the controller 120 is arranged to decrement the counter each time the routine 140 is referenced from the IRIT 135. Thus, every time the interpreter 125 calls the routine 140, a lookup in the IRIT 135 occurs. During this lookup, the counter is modified. In the example of a decrementing counter, in an example, the threshold is zero used to move the routine 140 may be set to zero.

In an example, the controller 120 may be arranged to decay the counter as a function of time. This addresses the issue of a long running program 130 in which routine 140 may be called sparingly. In this example, the routine 140 may never be "hot," but the counter value may grow large (or small) over time. By decaying the counter (e.g., reducing the counter for an incrementing example and increasing the counter for a decrementing example) the controller 120 solves this issue. In an example, to decay the counter, the controller 120 is arranged to increment incrementing the counter as a result of the function of time. In an example, the function of time is logarithmic. Thus, the size of a counter adjustment by the decay is inversely related to a time between a change in the counter and the adjustment of the decay. In an example, the function of time is exponential. In an example, the function of time is linear (e.g., adding one to a decrementing counter each time the decay is applied at regular intervals).

The controller 120 is arranged to move the routine 140 from the first class of memory 110 to the second class of memory 115 in response to the counter passing a threshold (mentioned above). This is illustrated in FIG. 1 in relation to routine 140. In an example, the movement of the routine 140 is triggered by a calculation including both the counter and a size of the routine 140. Thus, in an example, the threshold may be set based on the size of the routine 140. In this Example, if routine 140 is large, it will consume more space in the second class of memory 115 than if it were small. This additional space consumption will limit other routines that may be moved to the second class of memory 115. However, if the routine 140 is called very frequently, it may be worth leaving the other routines in the first class of memory 115. Thus, this calculation taking into account both the frequency with which the routine 140 is called as well as the impact on the second class of memory 115 that results from moving the routine 140 to the second class of memory 115.

The controller 120 is arranged to update the entry 145 in the IRIT 135 for the routine 140 with an address in the second class of memory 115 corresponding to the routine 140. Moving the routine 140 and updating the IRIT 135 allows the dynamic movement of routines between the first class of memory 110 and the second class of memory 115 without impacting the design of the interpreter 125 or the execution of the program 130.

The use of the counters to move the routine 140 described above also address a problem in many SRAM cache schemes in heterogeneous memory environments. Generally, cache techniques load each routine called into the cache memory and evict the oldest routine when space is requested for the most recent routine. Smart caching may hold specific routines in the cache, but these are generally specified by the programmer of the program 130. Using the counters, however, the device 105 is able to automatically (e.g., without programmer specification) and efficiently evict routines or not move routines based on the behavior of the program 130.

In an example, the controller 120 is arranged to monitor use of the second class of memory 115 to determine that the use has passed a use threshold. When this occurs, the controller 120 may evaluate entries 145 in the IRIT 145 that reference the second class of memory 115 to identify the routine 140 as a candidate for eviction. In an example, to evaluate the entries 145, the controller 120 is arranged to sort the entries 145 by a time stamp of a last reference to the entry 145 and select entries 145 from oldest to newest until a usage of the second class of memory 115 by routines corresponding to the entries 145 meets a free threshold as candidates for eviction. Thus, the oldest entries 145 may be removed until there is enough free space in the second class of memory 115. In an example, instead of the timestamp, the counter may be used, with the sorting being based on the counter values, and routines with counter values closer to the default counter value being removed until there is enough (as measured by the free threshold) space free in the second class of memory 115.

In an example, to evaluate the entries, the controller 120 is arranged to sort the entries 145 by a respective counter value for each entry. In an example, the counter decrements in response to being referenced and increments as a function of time (e.g., the decay). The controller 120 is also arranged to select entries 145 from largest corresponding counter to smallest corresponding counter until a usage of the second class of memory 115 by routines corresponding to the entries 145 meets the free threshold as candidates for eviction. In an example, when there is a time between two routines to be evicted, the timestamp may break the tie; the older routine being evicted over the newer routine. Using the counter value for eviction may work better with a performant decay technique applied to the counters, as described above.

After evaluating the entries in the IRIT, the controller 120 may continue by evicting the routine 140 from the second class of memory 115 in response to its identification as a candidate for eviction. In an example, to evict the routine, the controller 120 is arranged to update the entry in the IRIT for the routine with an original address for the routine 140 in the first class of memory 110. In an example, the routine 140 is never erased from the first class of memory 110. Thus, when the routine 140 is moved to the second class of memory 115, it is rather copied. However, as the IRIT 135 is changed, the program's reference to the routine 140 and the interpreter's call to the routine, refer to the copy rather than the original.

Figure 2:
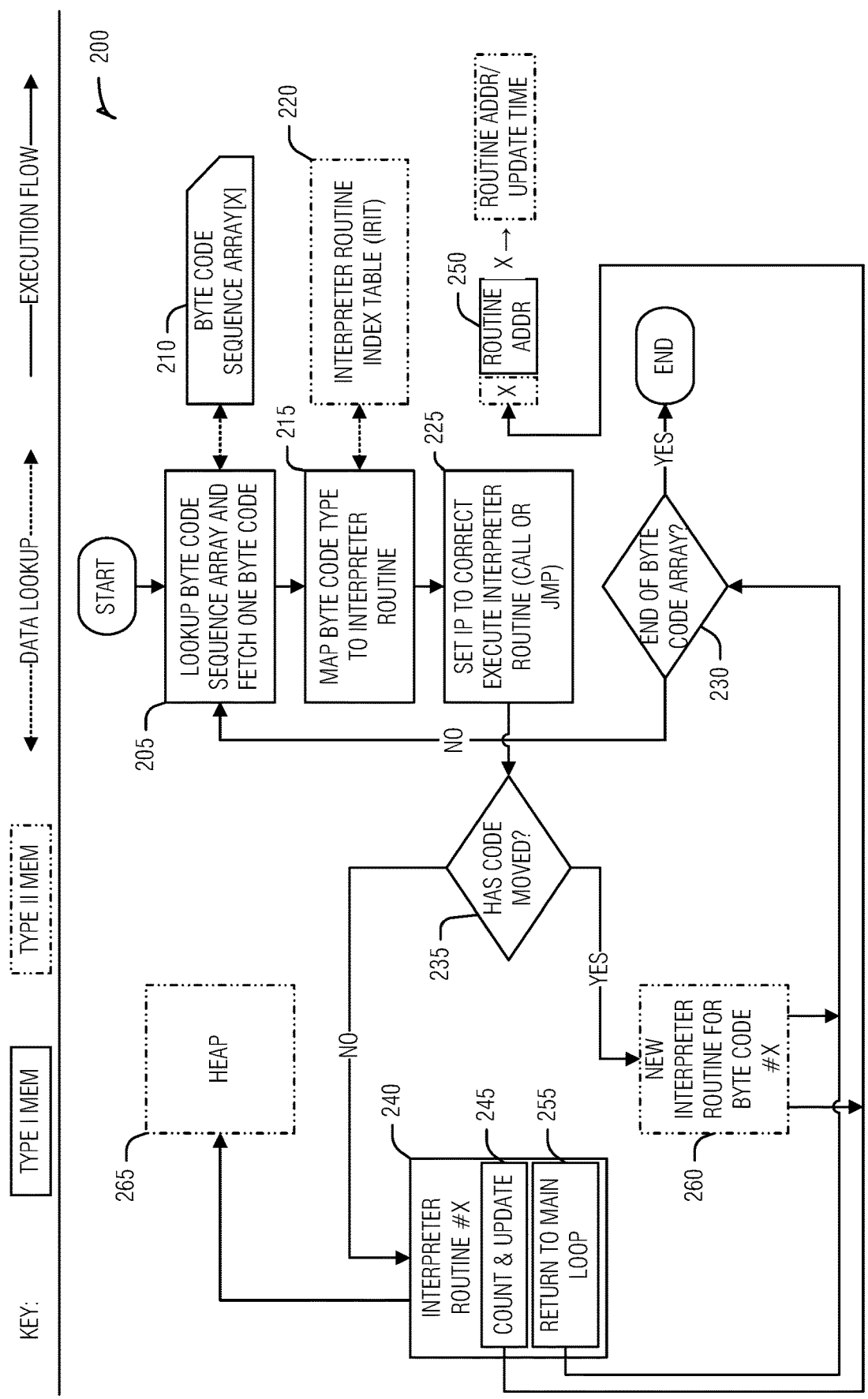
FIG. 2 is a diagram illustrating data and control flow in a system for dynamic code execution location in heterogeneous memory, according to an embodiment.

FIG. 2 is a diagram illustrating data and control flow 200 in a system for dynamic code execution location in heterogeneous memory, according to an embodiment. Elements of the control flow 200 are implemented in electronic hardware, such as that described above or below with respect to FIG. 4 (e.g., circuits).

The workflow 200 is of a VM interpreter executing a program. The solidly outlined elements are executed in place from type I memory and the dot-dot-dashed outlined elements are executed from type II memory. The interpreter is executing on an MCU in this example. In contrast to traditional interpreter execution, the IRIT 220 is in type II memory rather than type I memory.

The interpreter loop fetches (operation 205) each bytecode (e.g., from the sequence array 210) and performs a look up in IRIT 220 table (or via a "switch") (operation 215). The interpreter then sets interpreter register variable ip to target interpreter routine (operation 225). The address in ip will be used to execute the routine. Because the routine may have moved (decision) either the routine 240 in type I memory or the routine 260 in type II memory will be executed. Although illustrated as a decision in the loop, practically, the selection of routine 240 or routine 260 is performed at operation 225 when either the address for routine 240 or the address for routine 260 is placed into the ip variable.

Whether the routine is in type I memory or type II memory, a count and update (operation 245) is performed to adjust the counter 250 for the routine. As described above, the counter 250 provides a basis for determining whether to move the routine 240 from type I memory to routine 260 in type II memory, as well as providing information for eviction of the routine 260 back to routine 240. Thus, when a popular (e.g., "hot" or frequently called in relation to other routines) interpreter routing for a specific bytecode X is identified, with consideration of the cost (e.g., size) of that bytecode, a new piece of space will be allocated from SRAM for host Interpreter routing if there is some spare space. The IRIT 220 entry for the bytecode is modified by changing the destination address of this bytecode X from type I memory routing to type II memory routing.

As noted above, the eviction mechanism may be applied when the total usage of type II memory reaches a free threshold. The eviction mechanism may include recording a timestamp of each entries and, if the total usage of type II memory reaches the threshold, some SRAM pieces of hot runtime routines may be released to free type II memory space. In an example, the eviction policy may vary by the configuration (e.g., of the hardware, interpreter, etc.). As the space is freed, the IRIT 220 is updated to reflect the routing again shifting from type II memory routing to type I memory routing for the released routines.

After the routine is executed and the count and update (operation 245) is complete, the workflow continues back to the main event loop. If there are more bytecodes in the program (decision 230), the loop continues at operation 205, else the loop ends.

Figure 3:
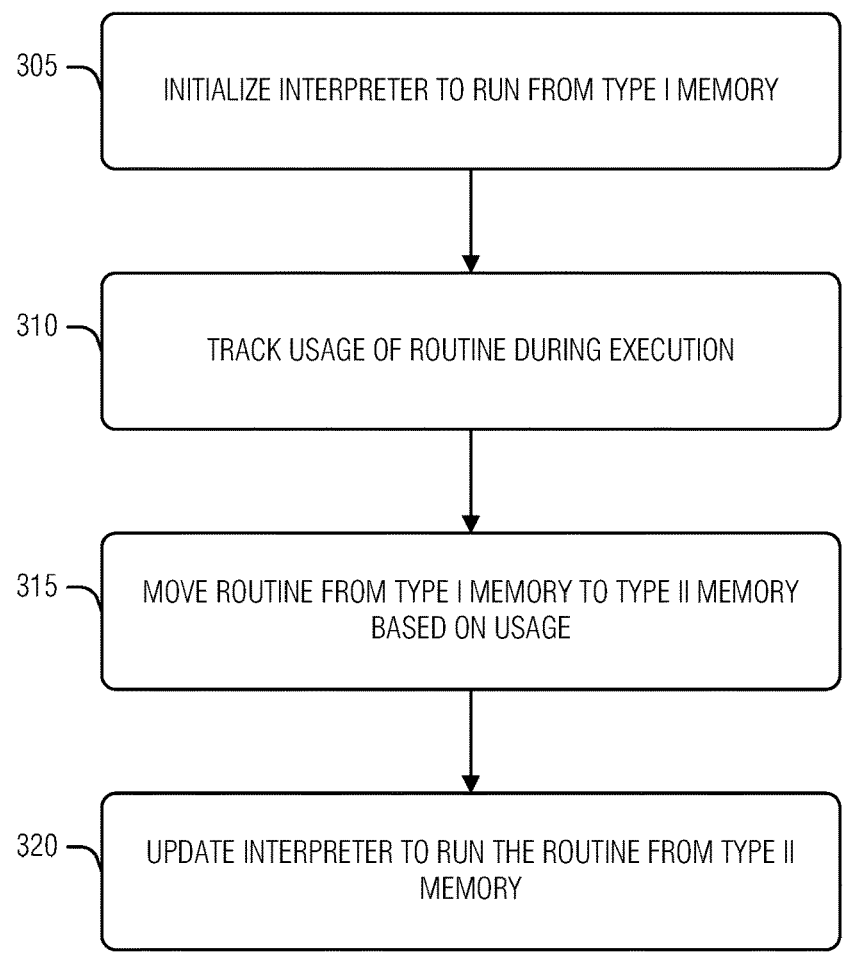
FIG. 3 is a flow chart of an example of a method for dynamic code execution location in heterogeneous memory, according to an embodiment.

FIG. 3 is a flow chart of an example of a method 300 for dynamic code execution location in heterogeneous memory, according to an embodiment. Elements of the control flow 200 are implemented in electronic hardware, such as that described above or below with respect to FIG. 4 (e.g., circuits).

At operation 305, an interpreter is initialized to execute a program from a first class of memory. In an example, the initializing includes locating an IRIT in a second class of memory and creating counters for routines in the IRIT. In an example, creating the counters includes creating the counter for the routine that has a default value. In an example, the default value is zero. In an example, the default value is 10.

The first class of memory and the second class of memory are both byte-addressable, but differ in that the second class of memory performs a read faster than the first class of memory. In an example, the first class of memory is an XIP flash device. In an example, the second class of memory is a SRAM device. In an example, the second class of memory is a DRAM device.

At operation 310, a counter for a routine is modified as it is referenced from the IRIT during execution. Here, the routine resides in the first class of memory. In an example, modifying the counter for the routine includes decrementing the counter each time the routine is referenced from the IRIT.

The method 300 may be extended to include decaying the counter as a function of time. In an example, decaying the counter includes incrementing the counter as a result of the function of time. In an example, the function of time is logarithmic. In an example, the function of time is exponential. In an example, the function of time is linear.

At operation 315, the routine is moved from the first class of memory to the second class of memory in response to the counter passing a threshold. In an example, with a decrementing counter, the threshold is zero.

At operation 320, an entry in the IRIT for the routine is updated with an address in the second class of memory corresponding to the routine.

The method 300 may be extended to include additional operations for eviction from the second class of memory. These operations may include monitoring use of the second class of memory to determine that the use has passed a use threshold and evaluating entries in the IRIT referencing the second class of memory to identify the routine as a candidate for eviction In an example, evaluating the entries includes sorting entries by a time stamp of a last reference to an entry and selecting entries from oldest to newest until a usage of the second class of memory by routines corresponding to the entries meets a free threshold as candidates for eviction. In an example, evaluating the entries includes sorting entries by a respective counter value for each entry, the counter decrementing in response to being referenced and incrementing as a function of time and selecting entries from largest corresponding counter to smallest corresponding counter until a usage of the second class of memory by routines corresponding to the entries meets a free threshold as candidates for eviction.

After evaluating the entries in the IRIT, the method 300 may continue eviction operations, including evicting the routine from the second class of memory in response to its identification as a candidate for eviction, the evicting including: updating the entry in the IRIT for the routine with an original address for the routine in the first class of memory.

Figure 4:
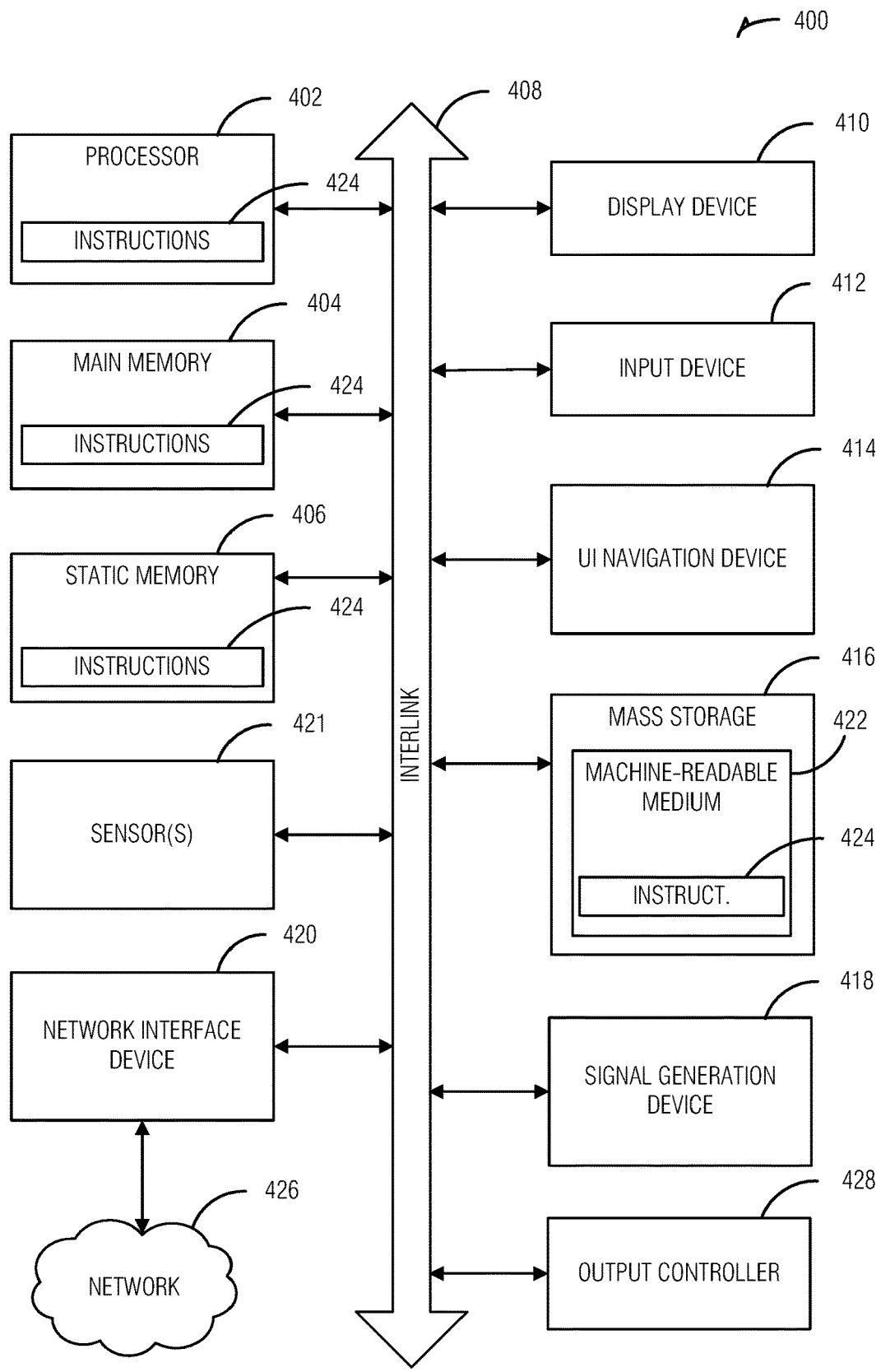
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples Example 1 is a system for dynamic code execution location in heterogeneous memory, the system comprising: a first class of memory; a second class of memory; and a controller to: initialize an interpreter to execute a program from the first class of memory, the initializing including locating an Interpreter Routine Address Table (IRIT) in the second class of memory and create counters for routines in the IRIT, the first class of memory and the second class of memory being byte-addressable, the second class of memory performing a read faster than the first class of memory; modify a counter for a routine as it is referenced from the IRIT during execution, the routine residing in the first class of memory; move the routine from the first class of memory to the second class of memory in response to the counter passing a threshold; and update an entry in the IRIT for the routine with an address in the second class of memory corresponding to the routine.

In Example 2, the subject matter of Example 1 optionally includes wherein, to create the counters, the controller is to set the counter for the routine to a default value.

In Example 3, the subject matter of Example 2 optionally includes wherein, to modify the counter for the routine, the controller is to decrement the counter each time the routine is referenced from the IRIT.

In Example 4, the subject matter of Example 3 optionally includes wherein the threshold is zero.

In Example 5, the subject matter of any one or more of Examples 1-4 optionally include wherein the counter is to decay the counter as a function of time.

In Example 6, the subject matter of Example 5 optionally includes wherein, to decay the counter, the controller is to increment the counter as a result of the function of time.

In Example 7, the subject matter of Example 6 optionally includes wherein the function of time is logarithmic.

In Example 8, the subject matter of any one or more of Examples 6-7 optionally include wherein the function of time is exponential.

In Example 9, the subject matter of any one or more of Examples 6-8 optionally include wherein the function of time is linear.

In Example 10, the subject matter of any one or more of Examples 1-9 optionally include wherein the controller is to: monitor use of the second class of memory to determine that the use has passed a use threshold; evaluate entries in the IRIT referencing the second class of memory to identify the routine as a candidate for eviction; and evict the routine from the second class of memory in response to its identification as a candidate for eviction, the evicting including: update the entry in the IRIT for the routine with an original address for the routine in the first class of memory.

In Example 11, the subject matter of Example 10 optionally includes wherein, to evaluate the entries, the controller is to: sort entries by a time stamp of a last reference to an entry; and select entries from oldest to newest until a usage of the second class of memory by routines corresponding to the entries meets a free threshold as candidates for eviction.

In Example 12, the subject matter of any one or more of Examples 10-11 optionally include wherein, to evaluate the entries, the controller is to: sort entries by a respective counter value for each entry, the counter decrementing in response to being referenced and incrementing as a function of time; and select entries from largest corresponding counter to smallest corresponding counter until a usage of the second class of memory by routines corresponding to the entries meets a free threshold as candidates for eviction.

In Example 13, the subject matter of any one or more of Examples 1-12 optionally include wherein the first class of memory is an execution in place (XIP) flash device and wherein the second class of memory is a static random access memory (SRAM) device.

Example 14 is a method for dynamic code execution location in heterogeneous memory, the method comprising: initializing an interpreter to execute a program from a first class of memory, the initializing including locating an Interpreter Routine Address Table (IRIT) in a second class of memory and creating counters for routines in the IRIT, the first class of memory and the second class of memory being byte-addressable, the second class of memory performing a read faster than the first class of memory; modifying a counter for a routine as it is referenced from the IRIT during execution, the routine residing in the first class of memory; moving the routine from the first class of memory to the second class of memory in response to the counter passing a threshold; and updating an entry in the IRIT for the routine with an address in the second class of memory corresponding to the routine.

In Example 15, the subject matter of Example 14 optionally includes wherein creating the counters includes setting the counter for the routine to a default value.

In Example 16, the subject matter of Example 15 optionally includes wherein modifying the counter for the routine includes decrementing the counter each time the routine is referenced from the IRIT.

In Example 17, the subject matter of Example 16 optionally includes wherein the threshold is zero.

In Example 18, the subject matter of any one or more of Examples 14-17 optionally include decaying the counter as a function of time.

In Example 19, the subject matter of Example 18 optionally includes wherein decaying the counter includes incrementing the counter as a result of the function of time.

In Example 20, the subject matter of Example 19 optionally includes wherein the function of time is logarithmic.

In Example 21, the subject matter of any one or more of Examples 19-20 optionally include wherein the function of time is exponential.

In Example 22, the subject matter of any one or more of Examples 19-21 optionally include wherein the function of time is linear.

In Example 23, the subject matter of any one or more of Examples 14-22 optionally include monitoring use of the second class of memory to determine that the use has passed a use threshold; evaluating entries in the IRIT referencing the second class of memory to identify the routine as a candidate for eviction; and evicting the routine from the second class of memory in response to its identification as a candidate for eviction, the evicting including: updating the entry in the IRIT for the routine with an original address for the routine in the first class of memory.

In Example 24, the subject matter of Example 23 optionally includes wherein evaluating the entries includes: sorting entries by a time stamp of a last reference to an entry; and selecting entries from oldest to newest until a usage of the second class of memory by routines corresponding to the entries meets a free threshold as candidates for eviction.

In Example 25, the subject matter of any one or more of Examples 23-24 optionally include wherein evaluating the entries includes: sorting entries by a respective counter value for each entry, the counter decrementing in response to being referenced and incrementing as a function of time; and selecting entries from largest corresponding counter to smallest corresponding counter until a usage of the second class of memory by routines corresponding to the entries meets a free threshold as candidates for eviction.

In Example 26, the subject matter of any one or more of Examples 14-25 optionally include wherein the first class of memory is an execution in place (XIP) flash device and wherein the second class of memory is a static random access memory (SRAM) device.

Example 27 is at least one machine readable medium including instructions that, when executed by a machine, cause the machine to perform any method of Examples 14-26.

Example 28 is a system comprising means to perform any method of Examples 14-26.

Example 29 is at least one machine readable medium including instructions for dynamic code execution location in heterogeneous memory, the instructions, when executed by a machine, cause the machine to perform operations comprising: initializing an interpreter to execute a program from a first class of memory, the initializing including locating an Interpreter Routine Address Table (IRIT) in a second class of memory and creating counters for routines in the IRIT, the first class of memory and the second class of memory being byte-addressable, the second class of memory performing a read faster than the first class of memory; modifying a counter for a routine as it is referenced from the IRIT during execution, the routine residing in the first class of memory; moving the routine from the first class of memory to the second class of memory in response to the counter passing a threshold; and updating an entry in the IRIT for the routine with an address in the second class of memory corresponding to the routine.

In Example 30, the subject matter of Example 29 optionally includes wherein creating the counters includes setting the counter for the routine to a default value.

In Example 31, the subject matter of Example 30 optionally includes wherein modifying the counter for the routine includes decrementing the counter each time the routine is referenced from the IRIT.

In Example 32, the subject matter of Example 31 optionally includes wherein the threshold is zero.

In Example 33, the subject matter of any one or more of Examples 29-32 optionally include wherein the operations comprise decaying the counter as a function of time.

In Example 34, the subject matter of Example 33 optionally includes wherein decaying the counter includes incrementing the counter as a result of the function of time.

In Example 35, the subject matter of Example 34 optionally includes wherein the function of time is logarithmic.

In Example 36, the subject matter of any one or more of Examples 34-35 optionally include wherein the function of time is exponential.

In Example 37, the subject matter of any one or more of Examples 34-36 optionally include wherein the function of time is linear.

In Example 38, the subject matter of any one or more of Examples 29-37 optionally include wherein the operations comprise: monitoring use of the second class of memory to determine that the use has passed a use threshold; evaluating entries in the IRIT referencing the second class of memory to identify the routine as a candidate for eviction; and evicting the routine from the second class of memory in response to its identification as a candidate for eviction, the evicting including: updating the entry in the IRIT for the routine with an original address for the routine in the first class of memory.

In Example 39, the subject matter of Example 38 optionally includes wherein evaluating the entries includes: sorting entries by a time stamp of a last reference to an entry; and selecting entries from oldest to newest until a usage of the second class of memory by routines corresponding to the entries meets a free threshold as candidates for eviction.

In Example 40, the subject matter of any one or more of Examples 38-39 optionally include wherein evaluating the entries includes: sorting entries by a respective counter value for each entry, the counter decrementing in response to being referenced and incrementing as a function of time; and selecting entries from largest corresponding counter to smallest corresponding counter until a usage of the second class of memory by routines corresponding to the entries meets a free threshold as candidates for eviction.

In Example 41, the subject matter of any one or more of Examples 29-40 optionally include wherein the first class of memory is an execution in place (XIP) flash device and wherein the second class of memory is a static random access memory (SRAM) device.

Example 42 is a system for dynamic code execution location in heterogeneous memory, the system comprising: means for initializing an interpreter to execute a program from a first class of memory, the initializing including locating an Interpreter Routine Address Table (IRIT) in a second class of memory and creating counters for routines in the IRIT, the first class of memory and the second class of memory being byte-addressable, the second class of memory performing a read faster than the first class of memory; means for modifying a counter for a routine as it is referenced from the IRIT during execution, the routine residing in the first class of memory; means for moving the routine from the first class of memory to the second class of memory in response to the counter passing a threshold; and means for updating an entry in the IRIT for the routine with an address in the second class of memory corresponding to the routine.

In Example 43, the subject matter of Example 42 optionally includes wherein the means for creating the counters includes means for setting the counter for the routine to a default value.

In Example 44, the subject matter of Example 43 optionally includes wherein the means for modifying the counter for the routine includes means for decrementing the counter each time the routine is referenced from the IRIT.

In Example 45, the subject matter of Example 44 optionally includes wherein the threshold is zero.

In Example 46, the subject matter of any one or more of Examples 42-45 optionally include means for decaying the counter as a function of time.

In Example 47, the subject matter of Example 46 optionally includes wherein the means for decaying the counter includes means for incrementing the counter as a result of the function of time.

In Example 48, the subject matter of Example 47 optionally includes wherein the function of time is logarithmic.

In Example 49, the subject matter of any one or more of Examples 47-48 optionally include wherein the function of time is exponential.

In Example 50, the subject matter of any one or more of Examples 47-49 optionally include wherein the function of time is linear.

In Example 51, the subject matter of any one or more of Examples 42-50 optionally include means for monitoring use of the second class of memory to determine that the use has passed a use threshold; means for evaluating entries in the IRIT referencing the second class of memory to identify the routine as a candidate for eviction; and means for evicting the routine from the second class of memory in response to its identification as a candidate for eviction, the evicting including: means for updating the entry in the IRIT for the routine with an original address for the routine in the first class of memory.

In Example 52, the subject matter of Example 51 optionally includes wherein the means for evaluating the entries includes: means for sorting entries by a time stamp of a last reference to an entry; and means for selecting entries from oldest to newest until a usage of the second class of memory by routines corresponding to the entries meets a free threshold as candidates for eviction.

In Example 53, the subject matter of any one or more of Examples 51-52 optionally include wherein the means for evaluating the entries includes: means for sorting entries by a respective counter value for each entry, the counter decrementing in response to being referenced and incrementing as a function of time; and means for selecting entries from largest corresponding counter to smallest corresponding counter until a usage of the second class of memory by routines corresponding to the entries meets a free threshold as candidates for eviction.

In Example 54, the subject matter of any one or more of Examples 42-53 optionally include wherein the first class of memory is an execution in place (XIP) flash device and wherein the second class of memory is a static random access memory (SRAM) device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for dynamic code execution location in heterogeneous memory, the system comprising:
   a first class of memory;
   a second class of memory; and
   a controller to:
      initialize an interpreter to execute a program from the first class of memory, the initializing including locating an Interpreter Routine Address Table (IRIT) in the second class of memory and create counters for routines in the IRIT, the first class of memory and the second class of memory being byte-addressable, the second class of memory performing a read faster than the first class of memory;
      modify a counter for a routine as it is referenced from the IRIT during execution, the routine residing in the first class of memory;
      move the routine from the first class of memory to the second class of memory in response to the counter passing a threshold; and
      update an entry in the IRIT for the routine with an address in the second class of memory corresponding to the routine.

2. The system of claim 1, wherein, to create the counters, the controller is to set the counter for the routine to a default value.

3. The system of claim 1, wherein the counter is to decay the counter as a function of time.

4. The system of claim 3, wherein the function of time is logarithmic.

5. The system of claim 3, wherein the function of time is exponential.

6. The system of claim 3, wherein the function of time is linear.

7. The system of claim 1, wherein the controller is to:
   monitor use of the second class of memory to determine that the use has passed a use threshold;
   evaluate entries in the IRIT referencing the second class of memory to identify the routine as a candidate for eviction; and evict the routine from the second class of memory in response to its identification as a candidate for eviction, the evicting including:
  update the entry in the IRIT for the routine with an original address for the routine in the first class of memory.

8. The system of claim 7, wherein, to evaluate the entries, the controller is to:
  sort entries by a respective counter value for each entry, the counter decrementing in response to being referenced and incrementing as a function of time; and
  select entries from largest corresponding counter to smallest corresponding counter until a usage of the second class of memory by routines corresponding to the entries meets a free threshold as candidates for eviction.

9. A method for dynamic code execution location in heterogeneous memory, the method comprising:
  initializing an interpreter to execute a program from a first class of memory, the initializing including locating an Interpreter Routine Address Table (IRIT) in a second class of memory and creating counters for routines in the IRIT, the first class of memory and the second class of memory being byte-addressable, the second class of memory performing a read faster than the first class of memory;
  modifying a counter for a routine as it is referenced from the IRIT during execution, the routine residing in the first class of memory;
  moving the routine from the first class of memory to the second class of memory in response to the counter passing a threshold; and
  updating an entry in the IRIT for the routine with an address in the second class of memory corresponding to the routine.

10. The method of claim 9, wherein creating the counters includes setting the counter for the routine to a default value.

11. The method of claim 9, comprising decaying the counter as a function of time.

12. The method of claim 11, wherein the function of time is logarithmic.

13. The method of claim 11, wherein the function of time is exponential.

14. The method of claim 11, wherein the function of time is linear.

15. The method of claim 9, comprising:
  monitoring use of the second class of memory to determine that the use has passed a use threshold;
  evaluating entries in the IRIT referencing the second class of memory to identify the routine as a candidate for eviction; and
  evicting the routine from the second class of memory in response to its identification as a candidate for eviction, the evicting including:
    updating the entry in the IRIT for the routine with an original address for the routine in the first class of memory.

16. The method of claim 15, wherein evaluating the entries includes:
  sorting entries by a respective counter value for each entry, the counter decrementing in response to being referenced and incrementing as a function of time; and
  selecting entries from largest corresponding counter to smallest corresponding counter until a usage of the second class of memory by routines corresponding to the entries meets a free threshold as candidates for eviction.

17. At least one machine readable medium including instructions for dynamic code execution location in heterogeneous memory, the instructions, when executed by a machine, cause the machine to perform operations comprising:
  initializing an interpreter to execute a program from a first class of memory, the initializing including locating an Interpreter Routine Address Table (IRIT) in a second class of memory and creating counters for routines in the IRIT, the first class of memory and the second class of memory being byte-addressable, the second class of memory performing a read faster than the first class of memory;
  modifying a counter for a routine as it is referenced from the IRIT during execution, the routine residing in the first class of memory;
  moving the routine from the first class of memory to the second class of memory in response to the counter passing a threshold; and
  updating an entry in the IRIT for the routine with an address in the second class of memory corresponding to the routine.

18. The at least one machine readable medium of claim 17, wherein creating the counters includes setting the counter for the routine to a default value.

19. The at least one machine readable medium of claim 17, wherein the operations comprise decaying the counter as a function of time.

20. The at least one machine readable medium of claim 19, wherein the function of time is logarithmic.

21. The at least one machine readable medium of claim 19, wherein the function of time is exponential.

22. The at least one machine readable medium of claim 19, wherein the function of time is linear.

23. The at least one machine readable medium of claim 17, wherein the operations comprise:
  monitoring use of the second class of memory to determine that the use has passed a use threshold;
  evaluating entries in the IRIT referencing the second class of memory to identify the routine as a candidate for eviction; and
  evicting the routine from the second class of memory in response to its identification as a candidate for eviction, the evicting including:
    updating the entry in the IRIT for the routine with an original address for the routine in the first class of memory.

24. The at least one machine readable medium of claim 23, wherein evaluating the entries includes:
  sorting entries by a respective counter value for each entry, the counter decrementing in response to being referenced and incrementing as a function of time; and
  selecting entries from largest corresponding counter to smallest corresponding counter until a usage of the second class of memory by routines corresponding to the entries meets a free threshold as candidates for eviction.

* * * * *